US012761667B2

(12) United States Patent
Kim et al.

(10) Patent No.: US 12,761,667 B2
(45) Date of Patent: Oct. 13, 2026

(54) PARKING ROBOT SAFETY DEVICE AND METHOD

(71) Applicants: Hyundai Motor Company, Seoul (KR); Kia Corporation, Seoul (KR); SUNGSHIN WOMEN'S UNIVERSITY R&DB FOUNDATION, Seoul (KR)

(72) Inventors: Won Hee Kim, Hwaseong-Si (KR); Soomin Shim, Hwaseong-Si (KR); Jaehoon You, Hwaseong-Si (KR); Hyo Jin Song, Incheon (KR); Yujin Song, Dongducheon-Si (KR); Namgyo Kim, Chuncheon-Si (KR); Sihyeon Park, Chungju-Si (KR); Seong Wook Hwang, Seoul (KR); Joon Young Kim, Seoul (KR); Jeong Min Oh, Seoul (KR)

(73) Assignees: Hyundai Motor Company, Seoul (KR); Kia Corporation, Seoul (KR); SUNGSHIN WOMEN'S UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 18/967,213

(22) Filed: Dec. 3, 2024

(65) Prior Publication Data

US 2026/0010167 A1 Jan. 8, 2026

(30) Foreign Application Priority Data

Jul. 8, 2024 (KR) ........................ 10-2024-0089347

(51) Int. Cl.
*G05D 1/633* (2024.01)
*E04H 6/42* (2006.01)
(Continued)

(52) U.S. Cl.
CPC ............ *G05D 1/633* (2024.01); *E04H 6/424* (2013.01); *G01S 13/931* (2013.01); (Continued)

(58) Field of Classification Search
CPC ..................................................... G05D 1/633
See application file for complete search history.

(56) References Cited

U.S. PATENT DOCUMENTS 10,156,848 B1 * 12/2018 Konrardy ................ B60L 53/36
12,503,101 B2 * 12/2025 Wang .................... B60W 30/06
(Continued)

FOREIGN PATENT DOCUMENTS

DE 102017220587 A1 * 5/2019 ............... E04H 6/36

OTHER PUBLICATIONS

Google Machine Translation of German Patent Pub. No. DE102017220587B4 to Nordbruch that was filed in 2017 (Year: 2017).*
(Continued)

*Primary Examiner* — Jean Paul Cass
(74) *Attorney, Agent, or Firm* — Banner & Witcoff, Ltd.

(57) ABSTRACT

A system may include a parking robot configured to provide an unmanned parking service by moving one or more vehicles within a designated work area, a boundary sensor disposed in a boundary area separating the designated work area from an external area and configured to detect an entry of an entity from the external area into the designated work area or an exit of the entity from the designated work area to the external area, a monitoring sensor disposed in the designated work area and configured to monitor the entity in the designated work area, and one or more processors. The one or more processors may be configured to: determine, via the monitoring sensor, an operation characteristic and a type of the entity, and control, based on a status of the parking
(Continued)

robot and the type and the operation characteristic of the entity, an operation of the parking robot.

20 Claims, 7 Drawing Sheets

(51) Int. Cl.
*G01S 13/931* (2020.01)
*G01S 17/931* (2020.01)
*G05D 101/00* (2024.01)
*G05D 101/10* (2024.01)
*G05D 111/10* (2024.01)
(52) U.S. Cl.
CPC ........ *G01S 17/931* (2020.01); *G05D 2101/10* (2024.01); *G05D 2101/22* (2024.01); *G05D 2111/17* (2024.01)

(56) References Cited

U.S. PATENT DOCUMENTS

| | | | | |
|---|---|---|---|---|
| 12,511,598 | B1 * | 12/2025 | Shah | B25J 11/001 |
| 12,517,515 | B2 * | 1/2026 | Matsumura | G05D 1/0214 |
| 2010/0161128 | A1 * | 6/2010 | Choi | E04H 6/422<br>901/1 |
| 2014/0277691 | A1 * | 9/2014 | Jacobus | B66F 9/063<br>700/216 |
| 2017/0318360 | A1 * | 11/2017 | Tran | A61B 5/0022 |
| 2018/0288586 | A1 * | 10/2018 | Tran | A42B 3/0433 |
| 2020/0180712 | A1 * | 6/2020 | Ibenthal | B60G 17/00 |
| 2023/0123587 | A1 * | 4/2023 | Jatt | B60W 30/06<br>701/23 |
| 2025/0130580 | A1 * | 4/2025 | Guja | B65G 67/20 |
| 2025/0172954 | A1 * | 5/2025 | Ahmad | G05D 1/2274 |
| 2025/0383666 | A1 * | 12/2025 | Steen | A01B 69/008 |
| 2025/0383667 | A1 * | 12/2025 | Steen | G05D 1/243 |
| 2025/0390099 | A1 * | 12/2025 | Du | G05D 1/2464 |
| 2026/0003366 | A1 * | 1/2026 | Suzuki | G01C 21/206 |
| 2026/0004661 | A1 * | 1/2026 | Mooney | B64C 39/024 |
| 2026/0010167 | A1 * | 1/2026 | Kim | E04H 6/424 |
| 2026/0010168 | A1 * | 1/2026 | Mursia | G05D 1/633 |

OTHER PUBLICATIONS

Lewis, John, A Comprehensive Guide to Light Curtains: Safety Applications and Emerging Trends, A3 (https://www.automate.org/industry-insights/a-comprehensive-guide-to-light-curtains-safety-applications-and-emerging-trends)(Jan. 3, 2024) (hereinafter "Lewis"). (Year: 2024).*

* cited by examiner

PARKING ROBOT SAFETY DEVICE AND METHOD

CROSS-REFERENCE TO RELATED APPLICATION

This application claims priority to and the benefit of Korean Patent Application No. 10-2024-0089347, filed in the Korean Intellectual Property Office on Jul. 8, 2024, the entire contents of which are incorporated herein by reference.

FIELD

The present disclosure relates to autonomous robots, and more particularly to a parking robot safety device.

BACKGROUND

In a robot-operated parking service area, if a person needs to park a vehicle or exit the service area, a human operator may need to directly operate or stop a robot for safety precautions.

Thus, there may be complications with operating unmanned parking equipment in such a parking lot environment that is not designed with unmanned operation in mind. This may require, for example, an additional separate space dedicated to a robot-operated parking service.

When only light detection and ranging (LiDAR) equipment is used, for example, in a robot or a vehicle for detecting the surrounding environments, it may be difficult to accurately distinguish between a vehicle, a person, or another vehicle in an adjacent parking space in a conventional parking lot. A collaborative robot safety system, which may include fences, light curtains, and closed-circuit television (CCTV) devices, may offer intelligent solutions, but the robots that work in such an environment may not respond appropriately to different categories of detected objects.

SUMMARY

The present disclosure attempts to provide a parking robot safety device and method capable of variably controlling a work operation of a parking robot according to the risk level of vision artificial intelligence-based obstacles in order to prevent the occurrence of safety accidents between a parking robot and an obstacle including a person and a vehicle while minimizing sanctions on the provision of a robot-based automatic parking service within a service area.

According to one or more example embodiments of the present disclosure, a system may include: a parking robot configured to provide an unmanned parking service by moving one or more vehicles within a designated work area; and a boundary sensor disposed in a boundary area separating the designated work area from an external area. The boundary sensor may be configured to detect an entry of an entity from the external area into the designated work area or an exit of the entity from the designated work area to the external area. The system may further include: a monitoring sensor disposed in the designated work area and configured to monitor the entity in the designated work area; and one or more processors communicatively coupled, via a network, to the parking robot, the boundary sensor, and the monitoring sensor. The one or more processors may be configured to: determine, via the monitoring sensor, an operation characteristic and a type of the entity; and control, based on a status of the parking robot and the type and the operation characteristic of the entity, an operation of the parking robot.

The boundary sensor may include a safety light curtain.

The designated work area may include a staging area that is located between the boundary area and a parking area. The parking area may not be adjacent to the boundary area. The boundary sensor may be configured to: detect the entity entering or exiting the staging area; and send, via the network, a notification indicating the entity entering or exiting the staging area.

The monitoring sensor may include: a plurality of sensors disposed in the designated work area; and a computer vision-based artificial intelligence model configured to extract, from data received from the plurality of sensors, information associated with safety measures for the parking robot.

The computer vision-based artificial intelligence model may be further configured to: determine the type of the entity by categorizing the entity as one of a person, a vehicle, a robot, or a miscellaneous object; and determine the operation characteristic based on the type of the entity.

The one or more processors may be further configured to determine, based on the operation characteristic, a risk level indicating a likelihood of an accident between the entity and the parking robot. The operation characteristic may include at least one of: a size of the entity or a speed of the entity. The one or more processors may be further configured to: control, based on the risk level, the operation of the parking robot to remain stationary or avoid the entity.

The monitoring sensor may include at least one of: a red-green-blue (RGB) camera, a thermal imaging camera, a lidar, or a radar.

The one or more processors may be configured to control the operation of the parking robot by: determining, within the designated work area, a specific area that is adjacent to the boundary area; and controlling, based on detecting the entity via the boundary sensor or the monitoring sensor, the operation of the parking robot to avoid the parking robot and the entity being located simultaneously in the specific area.

The one or more processors may be configured to control the operation of the parking robot by, based on the entity being a first vehicle, one of: controlling, based on the entity being in the specific area, the operation of the parking robot to keep at least a predetermined distance away from the specific area and execute a work assigned to the parking robot; or controlling, based on the entity being outside the specific area, the operation of the parking robot to unload a second vehicle that is loaded on the parking robot and move the second vehicle to a waiting area outside the specific area.

The one or more processors may be further configured to: designate the specific area as a staging area where the parking robot loads or unloads one or more vehicles within the designated work area.

According to one or more example embodiments of the present disclosure, a method performed by an apparatus may include: detecting, via a boundary sensor, an entry of an entity into a designated work area, in which a robot is operating; determining, via a monitoring sensor, an operation characteristic of the entity in the designated work area; determining, based on a status of the robot and the operation characteristic of the entity, a risk level indicating a likelihood of an accident within the designated work area; and controlling, based on the risk level, an operation of the robot to execute a safety measure. One or more vehicles may be moved based on a moving path of the robot within the designated work area Detecting the entry of the entity may include: detecting the entity entering a staging area that is located between a boundary area and a parking area. The boundary sensor may be disposed in the boundary area and configured to send, via a network, a notification indicating the entity entering the staging area.

Determining the operation characteristic of the entity may include: monitoring, via the monitoring sensor, the designated work area; and determining, based on applying a computer vision-based artificial intelligence model to data input received from the monitoring sensor, the operation characteristic of the entity. The monitoring sensor may include at least one of red-green-blue (RGB) camera, a thermal imaging camera, a lidar, or a radar.

Determining the risk level may include: determining a position of the robot and a path of the robot; and determining, based on the operation characteristic and based on the position and the path of the robot, a possibility of a collision between the robot and the entity. The operation characteristic may include at least one of a type of the entity, a size of the entity, a speed of the entity, or a distance of the entity to the robot.

Controlling the operation of the robot may include, based on the entity being a person, one of: controlling, based on a distance between the entity and the robot being less than a threshold distance, the operation of the robot to stop within a threshold time; or controlling, based on the distance being greater than the threshold distance, the operation of the robot to stop at a time that the entity is estimated, based on the operation characteristic of the entity, to be within the threshold distance away from the robot.

Determining the risk level may include: determining, based on the entity being not detected in a specific area within the designated work area, whether the robot is transporting a vehicle. The specific area may be adjacent to a boundary area.

Controlling the operation of the robot may include one of: controlling, based on the robot transporting the vehicle, the operation of the robot to stop; or controlling, based on the robot not transporting the vehicle, the operation of the robot to move to a waiting area.

Controlling the operation of the robot may include: controlling the operation of the robot to avoid the robot and the entity being located simultaneously in a specific area within the designated work area.

Controlling the operation of the robot may further include, based on the entity being a first vehicle and the entity being detected in the specific area, one of: controlling, based on the entity being in the specific area, the operation of the robot to keep at least a predetermined distance away from the specific area and execute a work assigned to the robot; or controlling, based on the entity being outside the specific area, the operation of the robot to unload a second vehicle that is loaded on the robot and move the second vehicle to a waiting area outside the specific area.

The specific area may be located within the designated work area and between a parking area and an external area. The specific area may be a staging area where the robot loads or unloads one or more vehicles.

With the parking robot safety device and method according to the present disclosure, by variably performing the safety measures on the parking robot based on the type and operation of obstacles determined using the vision artificial intelligence, it is possible to prevent the occurrence of safety accidents while minimizing sanctions such as the suspension of service provision of the parking robot.

DETAILED DESCRIPTION

Figure 1:
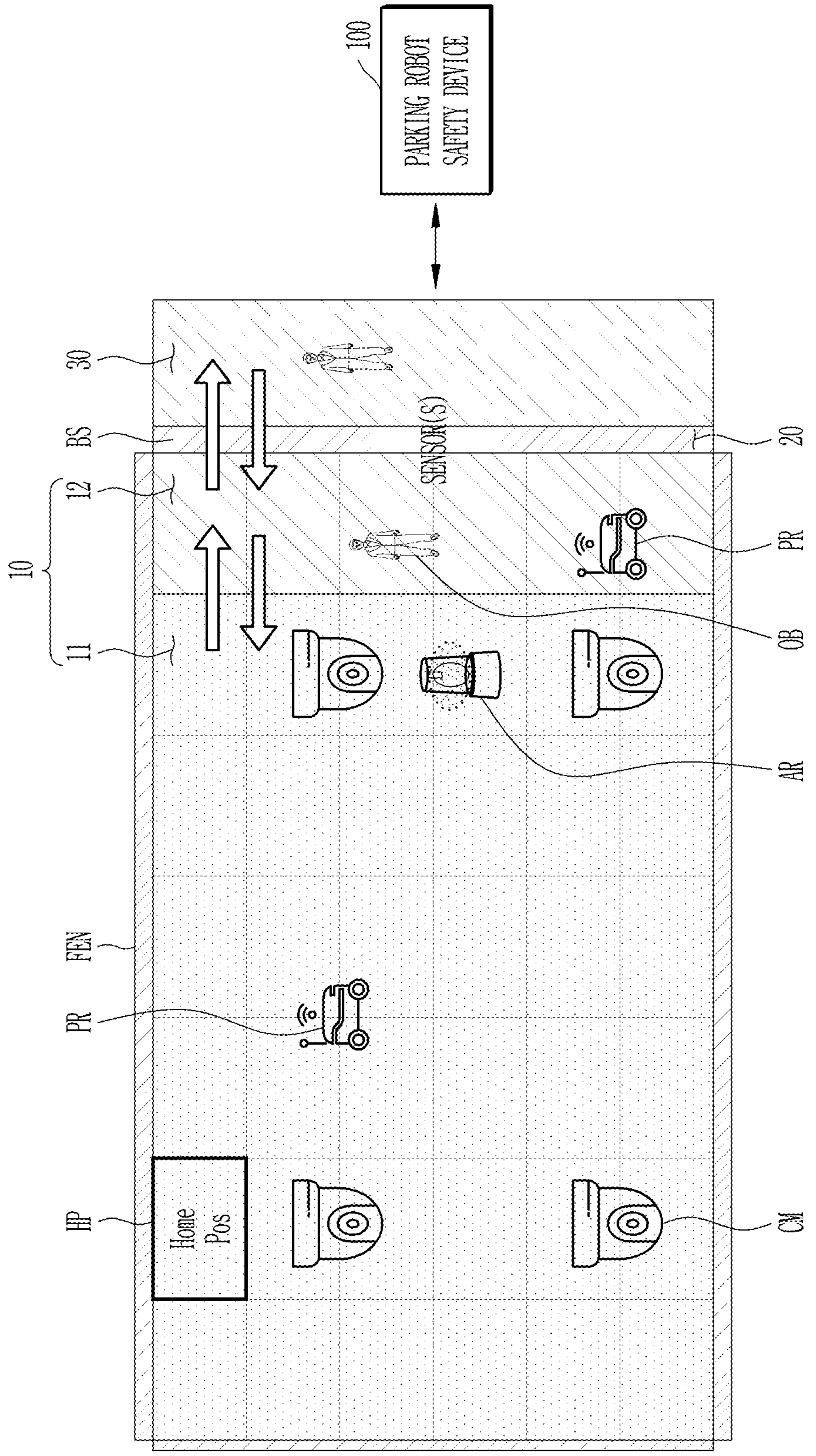
FIG. 1 illustrates a service area in which a parking robot safety device operates.

Hereinafter, one or more example embodiments of the present disclosure will be described more fully with reference to the accompanying drawings so as to be easily practiced by those skilled in the art to which the present disclosure pertains. As those skilled in the art would realize, the described example embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements. Terms including an ordinal number such as first, second, etc., may be used to describe various components, but the components are not limited to these terms. The above terms are used solely for the purpose of distinguishing one component from another.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

Terms such as "... unit", "... er/or", and "module" used in the specification may mean a unit capable of processing at least one function or operation described in the specification, which may be implemented as hardware or a circuit, software, or a combination of hardware or circuit and software.

Throughout the present disclosure, references to components, units, or modules generally refer to items that logically can be grouped together to perform a function or group of related functions. Like reference numerals are generally intended to refer to the same or similar components. Components, units, and modules may be implemented in software, hardware or a combination of software and hardware. The components, units, modules, and/or functions described above may be implemented and/or performed by one or more processors. For examples, the components, units, and/or modules may include processor(s), microprocessor (s), graphics processing unit(s), logic circuit(s), dedicated circuit(s), application-specific integrated circuit(s), programmable array logic, field-programmable gate array(s), controller(s), microcontroller(s), and/or other suitable hardware. The components, units, and/or modules may also include software control module(s) implemented with a processor or logic circuitry for example. The components, units, and/or modules may include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. One or more storage type media may include any or all of the tangible memory of computers, processors, or the like, or associated modules thereof, such as various semiconductor memories, tape drives, disk drives and the like, which may provide non-transitory storage at any time for software programming.

Hereinafter, one or more example embodiments of the present disclosure will be described with reference to the drawings.

FIG. 1 illustrates a service area in which a parking robot safety device operates. The service area may be defined as an area where a vehicle is automatically entered, exited, and parked through a parking robot.

A service area 10 may be defined as a robot work area 10 where a parking robot PR moves and operates. A plurality of parking robots PR may be provided. A parking robot may be an automated guided vehicle (AGV) or an autonomous mobile robot (AMR). An AGV may be a mobile device or vehicle that is capable of following a fixed (e.g., preprogrammed) path or track. The path or track may be marked with magnetic tapes or wires. An AGV may be a mobile device or vehicle that is capable of autonomously navigating in an uncontrolled environment without the need of fixed paths or tracks. AGVs and AMRs may be used for material transportation. For example, an AGV or an AMR may be used for transporting a vehicle. For example, an AGV or an AMR may be used as a parking robot that transports a vehicle from one area (e.g., a staging area) to another area (e.g., a parking spot). The parking robot PR may be a vehicle-carrying robot. The parking robot PR may be a parking guide that guides a vehicle along a programmed path (e.g., a parking path) to a designated parking spot.

The robot work area 10 may include a parking area 11 and an entry and exit area 12.

The parking area 11 may be an area where the parking robot PR parks a service vehicle (or a general vehicle) that has been entered. An obstacle OB may not enter the parking area 11.

The entry and exit area 12 (also referred to as a transition area, a threshold area, or a staging area) is an area through which a service vehicle may enter or exit. In the entry and exit area 12, the parking robot PR may load the entered vehicle to move to the parking area 11, or unload a vehicle carried from the parking area 11 for exit.

The entry and exit area 12 may be adjacent to a boundary area 20, and an obstacle may enter/exit through the entry and exit area 12. The entry and exit are 12 may be located between the boundary area 20 and the parking area 11.

At least one waiting area HP where the parking robot PR waits may be defined in the parking area 11. The waiting area HP may be an area where the parking robot PR is safely stored. The waiting area HP may be defined to be spaced apart from the entry and exit area 12 by a certain distance or more. The location and number of waiting areas HP may be determined variably.

The boundary area 20 may be defined between the robot work area 10 (also referred to as a designated work area) and an external area 30. The boundary sensor BS may be arranged in the boundary area 20. The boundary sensor BS may detect all objects or people entering/exiting the robot work area 10. The boundary area 20 may be adjacent to the entry and exit area 12 and may not be adjacent to the parking area 11.

The robot work area 10 may be defined by a boundary fence FEN. The parking robot PR moves through the parking area 11 and the entry and exit area 12 within the robot work area 10.

At least one monitoring sensor CM may be arranged in the robot work area 10. The monitoring sensor CM includes a camera sensor, etc., and may monitor the parking robot or obstacle OB operating within the robot work area 10.

At least one alarm module AR may be arranged in the robot work area 10. The alarm module AR may be connected to a parking robot safety device 100 to provide an alarm in a specific situation. For example, the alarm module AR may provide an alarm when the obstacle OB is detected through the boundary sensor BS.

Here, the obstacle OB (also referred to as an entity) is illustrated as a person, but is not limited thereto and may be an object including a person or a vehicle.

The parking robot safety device 100 may perform control to prevent safety accidents for the parking robot PR operating to provide an unmanned vehicle parking and charging service within the robot work area 10.

The parking robot safety device 100 may include all devices for safety measures arranged in the robot work area 10 and the boundary area 20.

The parking robot safety device 100 may be connected to a safety device including sensors arranged in the robot work area 10 and the boundary area 20 through a network.

The parking robot safety device 100 may perform various safety measures to prevent the occurrence of safety accidents in the robot work area 10 through the parking robot PR, the monitoring sensor CM of the robot work area 10, the alarm module AR, a boundary sensor BS of the boundary area 20, and the robot server connected to them through the network.

That is, the parking robot safety device 100 may stop or avoid the parking robot PR according to certain conditions when the obstacle OB entering the entry and exit area 12 is detected in order to prevent various safety accidents including collisions between the parking robot PR and the obstacle OB.

Figure 2:
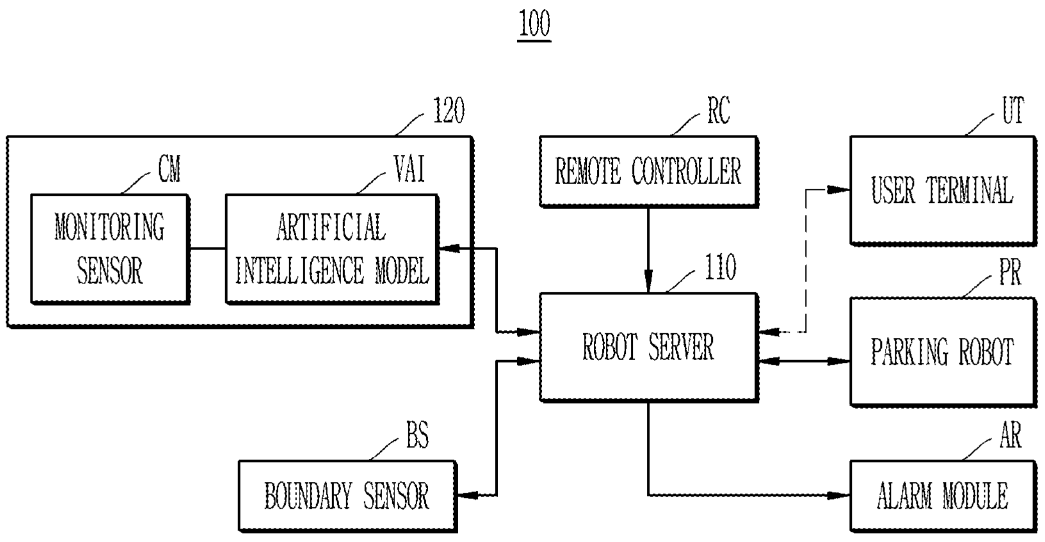
FIG. 2 is a block diagram of the parking robot safety device.

FIG. 2 is a block diagram of the parking robot safety device. Hereinafter, the description will be made with reference to FIG. 1.

Referring to FIG. 2, the parking robot safety device 100 may include the parking robot PR, the boundary sensor BS, a monitoring module 120, and a robot server 110. The parking robot PR, the boundary sensor BS, the monitoring module 120, and the robot server 110 may be connected to each other through the network. Two or more components as shown in FIG. 2 may be combined or integrated into one component. For example, one or more of the boundary sensor BS, the monitoring module 120, and the Alarm module AR may be integrated into the robot server 110.

The parking robot PR may carry a vehicle and move within the robot work area 10 to provide an unmanned parking service. The movement and operation of the parking robot PR may be controlled through the robot server 110.

The boundary sensor BS may be arranged in the boundary area 20 separating the robot work area 10 and the external area 30 to detect the entry and exit of the obstacle OB from the external area 30 into the robot work area 10.

The boundary sensor BS may include a safety light curtain. The boundary sensor BS may further include a physical blocking device. For example, the boundary sensor BS may further include a safety bar or an entry and exit blocking bar.

The boundary sensor BS detects the obstacle OB entering and exiting (e.g., passing through) the entry and exit area 12. The boundary sensor BS may notify the robot server 110 of the detection of the obstacle OB through the network.

The monitoring module 120 (also referred to as a monitoring device) is arranged within the robot work area 10.

The monitoring module 120 may identify (e.g., detect) the obstacle OB and monitor and track the operation of the identified obstacle OB.

The plurality of monitoring modules 120 may be provided in the robot work area.

The monitoring module 120 may include the monitoring sensor CM and a computer vision-based artificial intelligence model VAI.

The monitoring sensor CM may monitor the robot work area 10 in real time.

The monitoring sensor CM may include, but is not specially limited to, a red-green-blue (RGB) camera, a thermal imaging camera, an infrared camera, a light detection and ranging (lidar), a radar. The monitoring sensor CM may be implemented as various types of sensors for monitoring the robot work area 10.

The artificial intelligence model VAI may extract information necessary for safety measures from data input through the monitoring sensor CM.

The artificial intelligence model VAI may identify the obstacle OB detected by the monitoring sensor CM as one of a person, a vehicle, a robot, or other objects (e.g., a miscellaneous object or an uncategorized object).

The artificial intelligence model VAI may detect operation characteristics according to the type of the identified obstacle at the same time as the identification. The operation characteristics may include a moving speed, a moving pattern, an operation size, a collision radius, a collision risk, etc., of the obstacle.

The artificial intelligence model VAI may provide the type and operation characteristics of the identified obstacle OB to the robot server 110 through the network.

The robot server 110 may variably control the movement and operation of the parking robot PR based on the status of the parking robot PR, the type and operation of the obstacle OB.

The robot server 110 may predict the risk level of occurrence of safety accidents (e.g., a risk level indicating a likelihood of a safety accident) between the obstacle and the parking robot based on the operation characteristics including the type, size, and speed of the obstacle.

The robot server 110 may control the parking robot PR to stop its movement (e.g., remain stationary) or avoid the obstacle based on the predicted risk level of occurrence of safety accidents. For example, the robot server 110 may stop the parking robot in working when the predicted risk level of occurrence of safety accidents is higher than a certain level, and may issue a command to the parking robot in working to maintain the working and avoid the obstacle when the predicted risk level is lower than a certain level.

The robot server 110 may designate a specific area adjacent to the boundary area 20 within the robot work area 10. For example, the specific area may be designated as the entry and exit area 12.

When the obstacle OB is detected by the boundary sensor BS or the monitoring module 120, the robot server 110 may move the parking robot PR so that the obstacle OB and the parking robot PR are not located simultaneously within the entry and exit area 12.

When the obstacle is a vehicle, if the entry and exit area 12 of the obstacle vehicle is detected, the robot server 110 may move the parking robot PR outside the entry and exit area 12 by a predetermined distance from the entry and exit area 12 (e.g., control the parking robot PR to keep at least a predetermined distance away from the entry and exit area 12) and then proceed with the current work (e.g., execute a work assigned to the parking robot PR).

When the obstacle is a vehicle, if the entry and exit area 12 of the obstacle vehicle is detected, the robot server 110 may move the parking robot inside the entry and exit area 12 to the waiting area HP outside the entry and exit area 12 after unloading the vehicle on the parking robot.

The parking robot safety device 100 may further include the alarm module AR and a remote controller RC.

The alarm module AR may provide a visual or audible alarm within the robot work area 10 when the obstacle OB is detected through the boundary sensor BS. The alarm module AR may include an alarm device such as a siren. The location and number of alarm modules AR may be variably determined.

The alarm module AR may provide an alarm under the control of the robot server 110.

The remote controller RC may provide a button for manually controlling the operation of the parking robot PR. A manager or a user may operate the remote controller RC to stop or operate the parking robot PR in a situation where the safety measures are required.

The parking robot safety device 100 may further include a user terminal UT connected to the robot server 110 through the network.

The user terminal UT may include a smartphone, a tablet, a computer, a kiosk, etc. The user terminal UT may provide an application and/or interface that may access the robot server 110. The manager or user may perform safety measures on the parking robot PR through the user terminal UT connected to the robot server 110.

Figure 3:
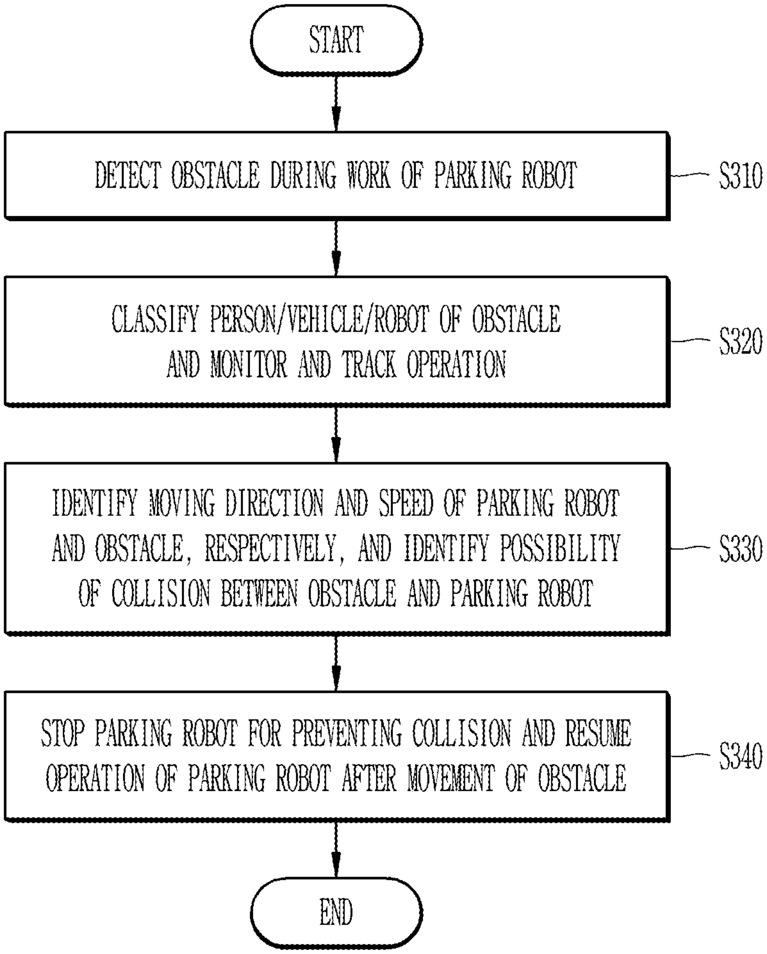
FIG. 3 and FIG. 4 are flowcharts of a parking robot safety method.
Figure 4:
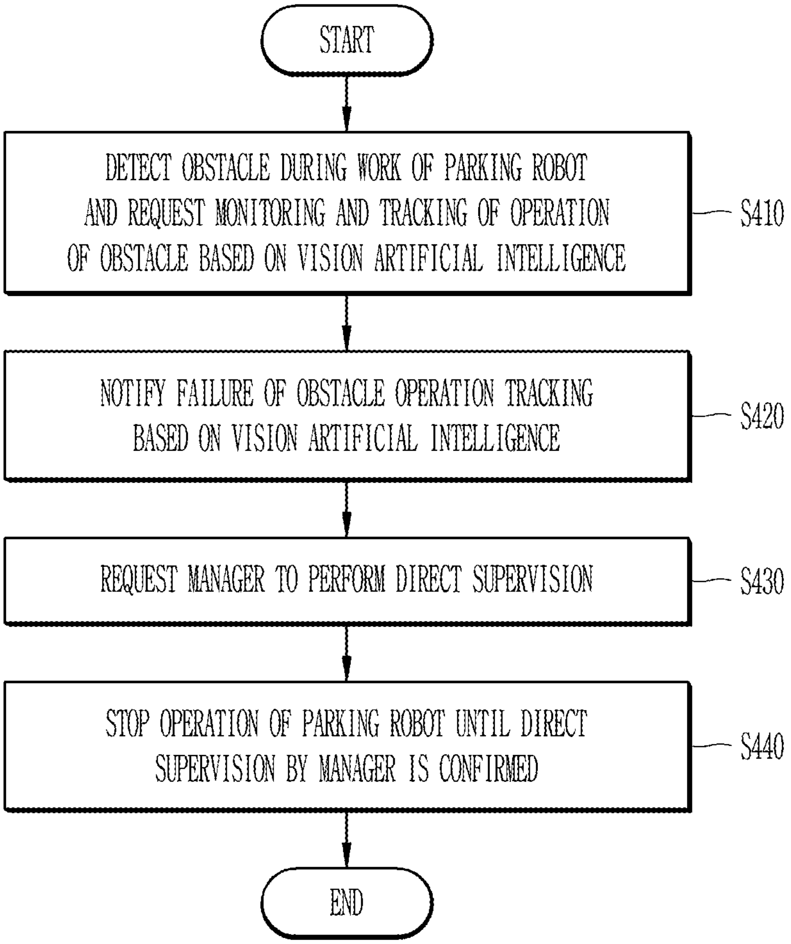

FIGS. 3 and 4 are flowcharts of a parking robot safety method. The parking robot safety method in FIGS. 3 and 4 may be performed by the parking robot safety device 100 (see FIG. 2). This will be described with reference to FIGS. 1 and 2.

In FIG. 3, the parking robot safety device 100 may detect the obstacle OB during the work of the parking robot PR (step S310).

The parking robot safety device 100 may detect the entry and exit of the obstacle OB into the robot work area 10 through the boundary sensor BS when the parking robot PR is working within the robot work area 10.

The parking robot safety device 100 may detect the obstacle OB entering and exiting (e.g., passing through) the entry and exit area 12 adjacent to the boundary area 20 where the boundary sensor BS is arranged within the robot work area 10 and may notify the robot server 110 of the entry and exit of the obstacle OB through the network.

The parking robot safety device 100 may classify the obstacle OB into a person, a vehicle, or a robot, and monitor and track the operations of each thereof (step S320).

The parking robot safety device 100 may identify the detected obstacle OB through the monitoring module 120 and monitor and track the operation of the identified obstacle OB.

The parking robot safety device 100 may monitor the robot work area 10 in real time through the monitoring sensor CM. The monitoring sensor C may be, for example, an RGB camera, a thermal imaging camera, a lidar, and/or a radar.

The parking robot safety device 100 may track the operation of the obstacle OB and detect the operation characteristics of the obstacle OB through the computer vision-based artificial intelligence model VAI from data input through the monitoring sensor CM.

The parking robot safety device 100 may identify the movement direction and speed of each of the parking robot PR and the obstacle OB (step S330).

The parking robot safety device 100 may identify the possibility of collision between the obstacle OB and the parking robot PR based on the movement direction and speed of each of the parking robot PR and the obstacle OB (step S330).

That is, the parking robot safety device 100 may determine the risk level of occurrence of safety accidents within the robot work area 10 based on the status of the parking robot PR and the tracked operation of the obstacle OB.

The parking robot safety device 100 may confirm the location and path of the parking robot PR and determine the possibility of collision between the parking robot PR and the obstacle OB based on the operation characteristics including the type, size, and speed of the obstacle OB and the distance of the obstacle OB to the parking robot PR.

The parking robot safety device 100 may stop the parking robot PR to prevent the collision and resume the operation of the parking robot PR after the obstacle OB moves (step S340).

The parking robot safety device 100 may stop or move the parking robot PR based on the possibility of collision. That is, the parking robot safety device 100 may maintain the work of the parking robot PR when the possibility of collision between the obstacle OB and the parking robot PR is lower than the standard.

The parking robot safety device 100 may control the movement and operation of the parking robot PR so that the obstacle OB and the parking robot PR are not located simultaneously within a specific area.

That is, the parking robot safety device 100 may determine that there is a high risk level of occurrence of safety accidents or a high possibility of collision when the obstacle OB and the parking robot PR are located simultaneously within the entry and exit area, and may move or stop the parking robot PR.

The parking robot safety device 100 may execute a safety measure that variably controls the operation of the parking robot PR based on the risk level.

The parking robot safety device 100 may immediately stop the parking robot PR (e.g., stop the parking robot PR within a threshold time) when the obstacle OB is a person and the distance between the person and the parking robot PR is closer than a threshold distance.

The parking robot safety device 100 may predict the time when the distance between the person and the parking robot PR becomes closer than a certain standard based on the operation characteristics of the person when the distance between the person and the parking robot PR becomes farther than a certain standard, and calculate the time when the parking robot PR stops.

That is, the parking robot safety device 100 calculates the time when the parking robot PR stops as the time when the distance between a person and the parking robot PR becomes closer than a certain standard, and controls the parking robot PR to stop at the corresponding time.

In FIG. 4, the parking robot safety device 100 may detect the obstacle OB during the work of the parking robot PR, and request the monitoring and tracking of the operation of the obstacle OB through the vision AI-based monitoring module 120 (step S410).

The parking robot safety device 100 may notify the manager of the failure of the vision AI-based obstacle movement tracking (step S420).

The parking robot safety device 100 may request the direct supervision confirmation from the manager (step S430).

That is, the parking robot safety device 100 may provide a notification to the manager so that the manager may directly track the obstacle OB through the monitoring sensor CM such as a camera or CCTV when the tracking of the operation of the obstacle OB fails through the artificial intelligence model VAI.

The parking robot safety device 100 may stop the operation of the parking robot PR until the direct supervision of the manager is confirmed (step S440).

The parking robot safety device 100 may provide the manager with control authority over the robot server 110 through the user terminal UT and/or the remote controller RC, etc., so that the manager may perform the control of safety measures when the manager's direct supervision is confirmed.

Figure 5:
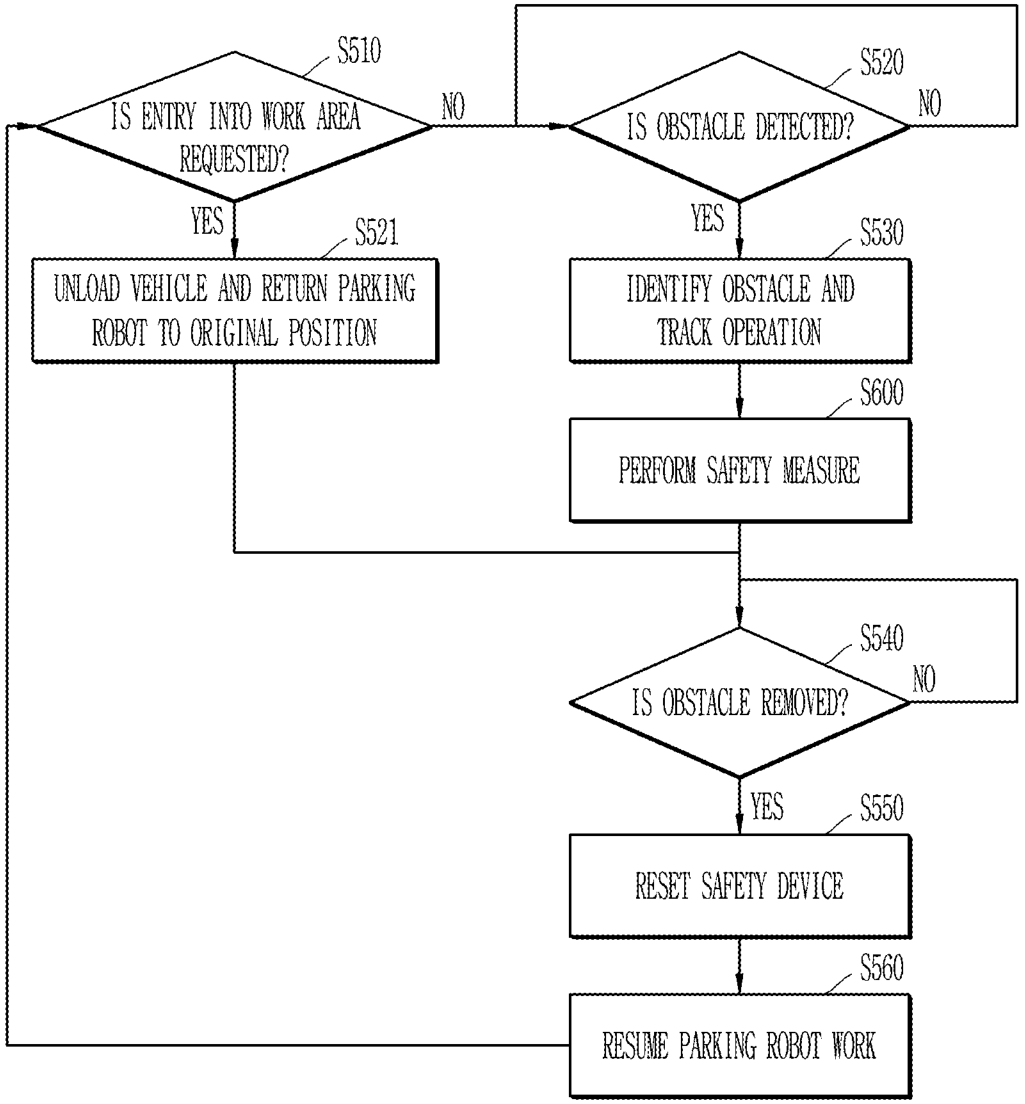
FIG. 5 and FIG. 6 are flowcharts of the parking robot safety method.
Figure 6:
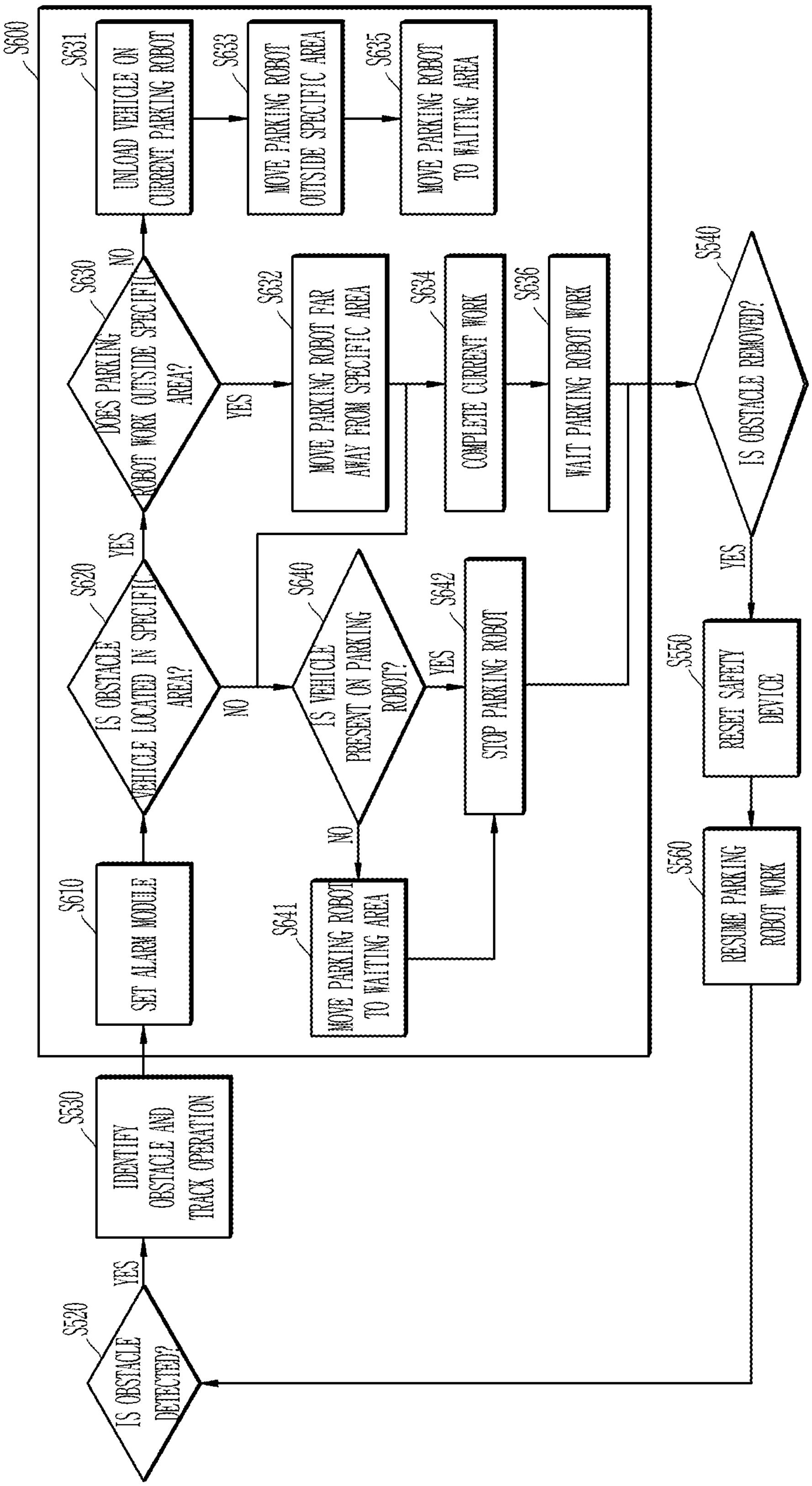

FIGS. 5 and 6 are flowcharts of the parking robot safety method. The parking robot safety method in FIGS. 5 and 6 may be performed by the parking robot safety device 100 (see FIG. 2).

FIG. 5 is a flowchart illustrating the safety measures in response to the entry and exit of the obstacle according to the parking robot safety method.

In FIG. 5, the parking robot safety device 100 checks whether the request for the entry and exit to the robot work area of a person or a vehicle is received through the robot server 110 (step S510).

When the entry request is confirmed, the parking robot safety device 100 may unload the vehicle loaded on the parking robot and return the parking robot to the original position which is the waiting area (step S521).

The parking robot safety device 100 may continuously determine whether the obstacle is detected in a situation where there is no entry request (step S520).

When the obstacle is detected, the parking robot safety device 100 may identify the detected obstacle as a person, a vehicle, or other objects and simultaneously track the operation (step S530).

The parking robot safety device 100 may perform the safety measures based on the tracked movement for the identified object (step S600).

For example, the parking robot safety device 100 may determine the risk level of occurrence of safety accidents including the possibility of collision between the obstacle and the parking robot, and variably control the movement and operation of the parking robot based on the risk level of occurrence of safety accidents.

The parking robot safety device 100 performs the safety measures until the obstacle is removed.

The parking robot safety device 100 may continuously identify whether the obstacle is removed (step S540).

The parking robot safety device 100 may reset safety devices including the monitoring sensor, the alarm module, the boundary sensor, etc., when the removal of the obstacle is confirmed (step S550).

The parking robot safety device 100 may resume the work of the parking robot whose work has been stopped (step S560).

FIG. 6 is a flowchart specifically describing the safety measure step (step S600) of FIG. 5. FIG. 6 illustrates the flow of the safety measures when the obstacle is a vehicle.

In FIG. 6, the parking robot safety device 100 may determine whether the obstacle is detected through the boundary sensor (step S520).

When the obstacle is detected, the parking robot safety device 100 may identify the detected obstacle as a person, a vehicle, or other objects and track the operation (step S530).

When the obstacle is detected and identified, the parking robot safety device 100 may set the alarm module and provide the alarm through a siren, etc., within the robot work area (step S610).

The parking robot safety device 100 may determine whether the obstacle vehicle is located in a specific area, which is generally designated as the entry and exit area adjacent to the boundary area, through the monitoring sensor, etc. (step S620).

That is, the parking robot safety device 100 may make the determination of the risk level different depending on whether the obstacle vehicle is located in the specific area.

The specific area may be designated as a specific part within the entry and exit area. For example, the parking robot safety device 100 may partially designate the specific area adjacent to the parking area within the entry and exit area.

When it is confirmed that the obstacle vehicle is not located in a specific area, the parking robot safety device 100 may determine whether a vehicle is loaded on the parking robot (step S640).

That is, the parking robot safety device 100 may determine the risk level differently depending on whether the parking robot is loaded with a vehicle. The parking robot safety device 100 variably determines control for the parking robot based on different risk levels.

The parking robot safety device 100 may immediately move the parking robot that is not loaded with a vehicle to the waiting area (step S641).

The parking robot safety device 100 may immediately stop the operation of the parking robot carrying (e.g., transporting) the vehicle (step S642).

The parking robot safety device 100 controls the movement and operation of the parking robot so that the obstacle and the parking robot are not located simultaneously within a specific area.

When the parking robot safety device 100 determines that the obstacle vehicle is located within a specific area, it checks whether the parking robot is working outside the specific area (step S630).

That is, the parking robot safety device 100 may distinguish between a parking robot that is working outside a specific area and a parking robot that is working within a specific area to execute control for safety measures.

The parking robot safety device 100 may unload a vehicle when the vehicle is currently loaded onto the parking robot, for the parking robot that is working within the specific area (step S631).

The parking robot safety device 100 may move the parking robot, which has unloaded the vehicle, outside the specific area (step S633).

The parking robot safety device 100 may move the parking robot, which has been moved outside the specific area, to the waiting area (step S635).

For the parking robot that is working outside a specific area, the parking robot safety device 100 may move the corresponding parking robot by at least a predetermined distance from the specific area.

The parking robot safety device 100 may complete the current work of the parking robot that has moved far away (step S634).

The parking robot safety device 100 may make the parking robot that has completed the work wait (step S636).

For the parking robot that is working outside the specific area and has moved far away from the specific area, when the current task cannot be completed, the parking robot safety device 100 may confirm whether a vehicle exists on the parking robot (step S640) and move the corresponding parking robot to the waiting area (step S641) or stop the parking robot immediately (e.g., within a threshold time) (step S642).

The parking robot safety device 100 may continuously confirm whether the obstacle has been removed from the robot work area 10 (step S540).

When the removal of the obstacle is confirmed, the parking robot safety device 100 may reset safety devices including various sensors, alarms, etc., (step S550) and resume the work of the parking robots (step S560).

Figure 7:
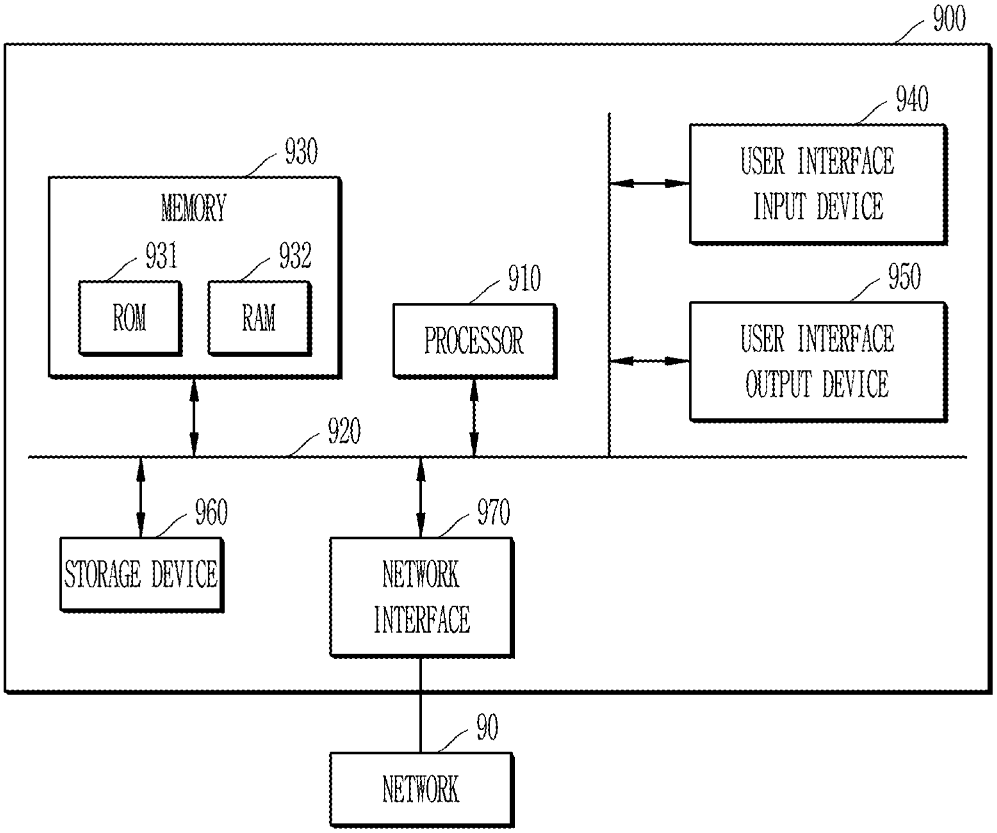
FIG. 7 is a diagram for describing a computing device.

FIG. 7 is a diagram for describing a computing device.

Referring to FIG. 7, the parking robot safety device and method may be implemented using a computing device 900.

The computing device 900 may include at least one of a processor 910, a memory 930, a user interface input device 940, a user interface output device 950, and a storage device 960 that communicate via a bus 920. The computing device 900 may also include a network interface 970 that is electrically connected to a network 90. The network interface 970 may transmit or receive signals to and from other entities through the network 90.

The processor 910 may be implemented in various types such as a micro controller unit (MCU), an application processor (AP), a central processing unit (CPU), a graphic processing unit (GPU), a neural processing unit (NPU), and may be any semiconductor device that executes instructions stored in the memory 930 or the storage device 960. The processor 910 may be configured to implement the functions and methods described above with reference to FIGS. 1 to 6.

The memory 930 and the storage device 960 may include various types of volatile or non-volatile storage media. For example, the memory may include a read only memory (ROM) 931 and a random access memory (RAM) 932. The memory 930 may be positioned inside or outside the processor 910, and the memory 930 may be connected to the processor 910 through various means that are well-known.

At least some components or functions of the parking robot safety device and method may be implemented as a program or software running on the computing device 900, and the program or software may be stored on a computer-readable medium.

At least some components or functions of the parking robot safety device and method may be implemented using hardware or circuits of the computing device 900, or may be implemented as separate hardware or circuit that may be electrically connected to the computing device 900.

According to an aspect of the present disclosure, a parking robot safety device includes a parking robot that carries a vehicle and moves the vehicle within a robot work area to provide an unmanned parking service, a boundary sensor that is arranged in a boundary area separating the robot work area and an external area and detects an entry and exit of an obstacle from the external area into the robot work area, a monitoring module that is arranged in the robot work area and identifies the obstacle and monitors and tracks an operation of the identified obstacle, and a robot server that is connected to the parking robot, the boundary sensor, and the monitoring module through a network and variably controls the operation of the parking robot based on a status of the parking robot and the type and operation of the obstacle.

The boundary sensor may include a safety light curtain.

The robot work area may include an entry and exit area adjacent to the boundary area and a parking area non-adjacent to the boundary area, and the boundary sensor may detect the obstacle entering and exiting the entry and exit area and notify the robot server of the detection of the obstacle through the network.

The monitoring module may include a plurality of monitoring sensors provided in the robot work area to monitor the robot work area in real time, and a computer vision-based artificial intelligence model that extracts information necessary for the safety measures from data input through the monitoring sensor.

The monitoring sensor may include an RGB camera, a thermal imaging camera, a lidar, and a radar.

The artificial intelligence model may identify the obstacle detected by the monitoring sensor as one of a person, a vehicle, a robot, or other objects, and simultaneously detect operation characteristics according to the type of the identified obstacle, and provide the type and operation characteristics of the identified obstacle to the robot server.

The robot server may predict a risk level of occurrence of a safety accident between the obstacle and the parking robot based on the operation characteristics including the type, size, and speed of the obstacle, and stop or avoid the parking robot based on the predicted risk of the safety accident.

The robot server may designate a specific area adjacent to the boundary area within the robot work area, and when the obstacle is detected through the boundary sensor or the monitoring module, move the parking robot so that the obstacle and the parking robot are not located within the specific area at the same time.

When the obstacle is a vehicle, if the entry and exit of the obstacle vehicle into the specific area is detected, the robot server may move the parking robot outside the specific area by a preset distance from the specific area and then proceed with a current work, and cause the vehicle on the parking robot within the specific area to be unloaded and then move the vehicle to a waiting area outside the specific area.

The robot server may designate the specific area as an entry and exit area, which is an area where the parking robot loads and unloads a vehicle, within the robot work area.

According to another aspect of the present disclosure, a parking robot safety method includes detecting an entry and exit of an obstacle into a robot work area through a boundary sensor during work of a parking robot within the robot work area, identifying the detected obstacle through a monitoring module and monitoring and tracking an operation of the identified obstacle, determining a risk level of occurrence of a safety accident within the robot work area based on a status of the parking robot and the tracked operation of the obstacle, and executing a safety measure for variably controlling the operation of the parking robot based on the determined risk level.

The detecting of the entry and exit of the obstacle into the robot work area through the boundary sensor may include detecting an obstacle entering and exiting an entry and exit area adjacent to the boundary area where the boundary sensor is arranged within the robot work area and notifying the robot server of the entry and exit of the obstacle through a network.

The identifying of the detected obstacle and the monitoring and tracking of the operation of the identified obstacle may include monitoring the robot work area in real time through a monitoring sensor including an RGB camera, a thermal imaging camera, a lidar, and a radar, and tracking the operation of the obstacle and detecting the operation characteristics through a computer vision-based artificial intelligence model from data input through the monitoring sensor.

The determining of the risk level of occurrence of the safety accident within the robot work area based on the status of the parking robot and the tracked operation of the obstacle may include confirming a position and path of the parking robot, and determining a possibility of a collision between the parking robot and the obstacle based on the operation characteristics including a type, size, and speed of the obstacle and a distance of the obstacle to the parking robot.

The executing of the safety measure for variably controlling the operation of the parking robot based on the risk level may include, when the obstacle is a person, if a distance between the person and the parking robot is closer than a certain standard, immediately stopping the parking robot, and when it is farther than the certain standard, predicting a time when the person becomes closer than the certain standard based on operation characteristics of the person to calculate a time when the parking robot stops.

The determining of the risk level of occurrence of the safety accident within the robot work area may include, when the obstacle is not detected in a specific area adjacent to the boundary area within the robot work area, determining whether the parking robot is carrying a vehicle.

The executing of the safety measure for variably controlling the operation of the parking robot based on the risk level may include, when the parking robot is carrying the vehicle, stopping the parking robot, and when the parking robot is not carrying the vehicle, moving the parking robot to a waiting area.

The executing of the safety measure for variably controlling the operation of the parking robot based on the risk level may include controlling the movement and operation of the parking robot so that the obstacle and the parking robot are not simultaneously located within the specific area.

The controlling of the movement and operation of the parking robot so that the obstacle and the parking robot are not simultaneously located within the specific area may include, when the obstacle is the vehicle, if the entry and exit of the obstacle vehicle into the specific area is detected, moving the parking robot outside the specific area by a preset distance from the specific area and then proceeding with a current work, and causing the vehicle on the parking robot within the specific area to be unloaded and then moving the vehicle to a waiting area outside the specific area.

The specific area may be located between the parking area and an external area within the robot work area and may be an entry and exit area where the parking robot loads and unloads the vehicle.

Although one or more example embodiments of the present disclosure have been described in detail hereinabove, the scope of the present disclosure is not limited thereto, but may include several modifications and alterations made by those skilled in the art to which the present disclosure pertains using a basic concept of the present disclosure as defined in the claims.

What is claimed is:

1. A system comprising:

a parking robot configured to provide an unmanned parking service by moving one or more vehicles within a designated work area;

a boundary sensor disposed in a boundary area separating the designated work area from an external area, wherein the boundary sensor is configured to detect an entry of an entity from the external area into the designated work area or an exit of the entity from the designated work area to the external area;

a monitoring sensor disposed in the designated work area and configured to monitor the entity in the designated work area; and one or more processors communicatively coupled, via a network, to the parking robot, the boundary sensor, and the monitoring sensor, wherein the one or more processors are configured to:

determine, via at least one of the boundary sensor or the monitoring sensor, entry of the entity into a staging area that is within the designated work area and is adjacent to the boundary area;

determine, via the monitoring sensor and based on the entry of the entity into the staging area, an operation characteristic of the entity, wherein the operation characteristic comprises at least one of:

a speed of the entity, a size of the entity, or a moving pattern of the entity;

based on the operation characteristic of the entity, a position of the parking robot, and a moving path of the parking robot, determine a risk level indicating a likelihood of collision, within the designated work area, between the parking robot and the entity; and control, based on the risk level, an operation of the parking robot to avoid the parking robot and the entity from being located simultaneously in the staging area.

2. The system of claim 1, wherein the boundary sensor comprises a safety light curtain.

3. The system of claim 1, wherein the staging area that is located between the boundary area and a parking area, wherein the parking area is not adjacent to the boundary area, and wherein the boundary sensor is configured to:

detect the entity entering or exiting the staging area; and send, via the network, a notification indicating the entity entering or exiting the staging area.

4. The system of claim 1, wherein the monitoring sensor comprises:

a plurality of sensors disposed in the designated work area; and a computer vision-based artificial intelligence model configured to extract, from data received from the plurality of sensors, information associated with safety measures for the parking robot.

5. The system of claim 4, wherein the computer vision-based artificial intelligence model is further configured to:

determine a type of the entity by categorizing the entity as one of a person, a vehicle, a robot, or a miscellaneous object; and determine the operation characteristic based on the type of the entity.

6. The system of claim 1, wherein the operation characteristic further comprises a collision radius, and wherein the one or more processors are configured to determine the risk level by:

determining the risk level based on the collision radius.

7. The system of claim 1, wherein:

the monitoring sensor comprises at least one of: a red-green-blue (RGB) camera, a thermal imaging camera, a lidar, or a radar.

8. The system of claim 1, wherein the one or more processors are configured to control the operation of the parking robot by:

controlling, based on the risk level being greater than a threshold value, the operation of the parking robot to stop or avoid the parking robot.

9. The system of claim 8, wherein the one or more processors are configured to control the operation of the parking robot by, based on the entity being a first vehicle, one of:

controlling, based on the entity being in the staging area, the operation of the parking robot to keep at least a predetermined distance away from the staging area and execute a work assigned to the parking robot; or controlling, based on the entity being outside the staging area, the operation of the parking robot to unload a second vehicle that is loaded on the parking robot and move the second vehicle to a waiting area outside the staging area.

10. The system of claim 9, wherein the parking robot is configured to load or unload one or more vehicles within the staging area.

11. A method performed by an apparatus, the method comprising:

detecting, via a boundary sensor, an entry of an entity, across a boundary area, into a staging area that is adjacent to the boundary area and is within a designated work area, in which a robot is operating, wherein one or more vehicles are moved based on a moving path of the robot within the designated work area;

determining, via a monitoring sensor and based on the entry of the entity into the staging area, an operation characteristic of the entity in the designated work area, wherein the operation characteristic comprises at least one of:

a speed of the entity, a size of the entity, or a moving pattern of the entity;

based on the operation characteristic of the entity, a position of the robot, and a moving path of the robot, determining a risk level indicating a likelihood of collision, within the designated work area, between the robot and the entity; and controlling, based on the risk level, an operation of the robot to avoid the robot and the entity from being located simultaneously in the staging area.

12. The method of claim 11, wherein the staging area is located between the boundary area and a parking area, and wherein the boundary sensor is disposed in the boundary area and configured to send, via a network, a notification indicating the entity entering the staging area.

13. The method of claim 11, wherein the determining of the operation characteristic of the entity comprises:

monitoring, via the monitoring sensor, the designated work area, wherein the monitoring sensor comprises at least one of red-green-blue (RGB) camera, a thermal imaging camera, a lidar, or a radar; and determining, based on applying a computer vision-based artificial intelligence model to data input received from the monitoring sensor, the operation characteristic of the entity.

14. The method of claim 13, further comprising:

determining the position of the robot and the moving path of the robot, wherein the operation characteristic further comprises at least one of a type of the entity or a distance of the entity to the robot.

15. The method of claim 11, wherein the controlling of the operation of the robot comprises, based on the entity being a person, one of:

controlling, based on a distance between the entity and the robot being less than a threshold distance, the operation of the robot to stop within a threshold time; or controlling, based on the distance being greater than the threshold distance, the operation of the robot to stop at a time that the entity is estimated, based on the operation characteristic of the entity, to be within the threshold distance away from the robot.

16. The method of claim 11, wherein the determining of the risk level comprises:

determining, based on the entity being not detected in a specific area within the designated work area, whether the robot is transporting a vehicle, and wherein the specific area is adjacent to the boundary area.

17. The method of claim 16, wherein the controlling of the operation of the robot comprises one of:

controlling, based on the robot transporting the vehicle, the operation of the robot to stop; or controlling, based on the robot not transporting the vehicle, the operation of the robot to move to a waiting area.

18. The method of claim 11, wherein the operation characteristic further comprises a collision radius, and wherein the determining of the risk level is based on the collision radius.

19. The method of claim 11, wherein the controlling of the operation of the robot further comprises, based on the entity being a first vehicle and the entity being detected in a specific area, one of:

controlling, based on the entity being in the specific area, the operation of the robot to keep at least a predetermined distance away from the specific area and execute a work assigned to the robot; or controlling, based on the entity being outside the specific area, the operation of the robot to unload a second vehicle that is loaded on the robot and move the second vehicle to a waiting area outside the specific area.

20. The method of claim 11, wherein the staging area is located between a parking area and an external area, and wherein the robot is configured to load or unload one or more vehicles in the staging area.

* * * * *